(12) United States Patent
Zhang et al.

(10) Patent No.: US 12,541,086 B2
(45) Date of Patent: *Feb. 3, 2026

(54) IMAGING METHOD AND APPARATUS FOR SELF-LUMINOUS OBJECT ON BIOLOGICAL SAMPLE FILM

(71) Applicant: SHANGHAI E-BLOT PHOTOELECTRIC TECHNOLOGY CO., LTD., Shanghai (CN)

(72) Inventors: Yinghao Zhang, Shanghai (CN); Yan Xi, Shanghai (CN)

(73) Assignee: SHANGHAI E-BLOT PHOTOELECTRIC TECHNOLOGY CO., LTD., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/675,075

(22) Filed: May 27, 2024

(65) Prior Publication Data

US 2024/0310618 A1    Sep. 19, 2024

Related U.S. Application Data

(63) Continuation of application No. 17/599,529, filed as application No. PCT/CN2020/081617 on Mar. 27, 2020, now Pat. No. 12,032,149.

(30) Foreign Application Priority Data

Mar. 28, 2019   (CN) .......................... 201910244792.X

(51) Int. Cl.
*G02B 21/36*   (2006.01)
*G02B 21/10*   (2006.01)

(52) U.S. Cl.
CPC ............ *G02B 21/365* (2013.01); *G02B 21/10* (2013.01)

(58) Field of Classification Search
CPC .... G02B 21/365; G02B 21/10; G01N 21/274; G01N 21/76; G01N 21/63
See application file for complete search history.

(56) References Cited

U.S. PATENT DOCUMENTS

| | | | |
|---|---|---|---|
| 2004/0022677 A1* | 2/2004 | Wohlstadter | G01N 21/253 422/52 |
| 2008/0240747 A1 | 10/2008 | Ikami | |
| 2015/0285762 A1 | 10/2015 | Pan et al. | |
| 2016/0006910 A1* | 1/2016 | Uri | H04N 23/51 348/373 |
| 2019/0025221 A1* | 1/2019 | Jackson | G01N 21/6452 |

OTHER PUBLICATIONS

Oct. 1, 2024 First Office Action issued in Chinese Patent Application No. 201910244792X.
Sep. 28, 2024 Search Report issued in Chinese Patent Application No. 201910244792X.
Dec. 9, 2024 First Office Action issued in European Patent Application No. 20777616.2.

* cited by examiner

*Primary Examiner* — Shahan Ur Rahaman
(74) *Attorney, Agent, or Firm* — Syncoda LLC; Feng Ma

(57) ABSTRACT

Provided are an imaging method and apparatus for a self-luminous object on a biological sample film; The imaging apparatus and imaging method can effectively and more accurately obtain a higher-definition target image of the self-luminous object; the operation process is simple and the time required for imaging is short; furthermore, the imaging apparatus has the advantages of a small structure, low cost of manufacture, convenient operation, and portability.

16 Claims, 10 Drawing Sheets

IMAGING METHOD AND APPARATUS FOR SELF-LUMINOUS OBJECT ON BIOLOGICAL SAMPLE FILM

CROSS-REFERENCE TO RELATED APPLICATIONS

This is a continuation of U.S. application Ser. No. 17/599,529 filed on Sep. 28, 2021, which is a national stage of international application No. PCT/CN2020/081617 filed on Mar. 27, 2020, which claims priority to Chinese Patent Application No. 201910244792.X filed on Mar. 28, 2019. The disclosures of the above-referenced applications are hereby incorporated by reference in their entirety.

BACKGROUND

Two types of biological self-luminous detection technologies are commonly used currently, one of type is the use of sensitive film technology, and the other of type is the use of camera shooting technology.

In the above technologies, the sensitive film technology is similar to the traditional method of photographic film development that fits the self-luminous object with a photosensitive film tightly in a darkroom and then develops the sensitized film by using a developer, to obtain an image corresponding to the self-luminous object. However, the operation process of this imaging method is complicated, and more steps are needed for a digital processing. The camera shooting technology is similar to the mobile phone shooting technology that arranges a camera and the self-luminous object into a darkroom, this method can store digital images directly, however, a long distance between the camera and the self-luminous object leads to defects of the low acquisition rate of optical signals with a long time of the data acquisition and the low sensitivity etc. Moreover, both the two imaging systems involve the defects of large size, big occupation space, high cost, difficult carrying and the like.

SUMMARY

The present disclosure relates to the field of sample analysis technology and particularly to an imaging method and apparatus for self-luminous object on a biological sample film.

The technical problem to be solved in the present disclosure is that the imaging methods for obtaining self-luminous object on biological sample film in the current technology involve complex operation process and long imaging time, and the imaging systems involve the defects of large size, big occupation space, high cost, difficult carrying and the like. The purpose of the present disclosure is to provide an imaging method and apparatus for imaging self-luminous object on a biological sample film.

The present disclosure solves the above-mentioned technical problems through the following technical solutions:
the present disclosure provides an imaging apparatus for self-luminous object on a biological sample film, which comprises a housing, a photoelectric conversion element, and an image correction device;
the inside of the housing forms a darkroom space;
the photoelectric conversion element is arranged in the housing;
the photoelectric conversion element is used for obtaining a first dark-field image inside the housing within a preset acquisition duration when the biological sample film is not inserted;
wherein the biological sample film carries a self-luminous object;
the photoelectric conversion element is further used for obtaining a second dark-field image inside the housing within the preset acquisition duration after affixing the biological sample film to the surface of the photoelectric conversion element;
the image correction device is used for performing correction processing on the second dark-field image according to the first dark-field image to obtain a target image corresponding to the self-luminous object.

Preferably, the formula corresponding to the image correction device performing correction processing on the second dark-field image according to the first dark-field image to obtain a target image corresponding to the self-luminous object is as follows:

$$I = I_0 - I_d$$

wherein I indicates pixel data corresponding to the target image, $I_0$ indicates pixel data corresponding to the second dark-field image, and $I_d$ indicates pixel data corresponding to the first dark-field image.

Preferably, the imaging apparatus further comprises a light source device, the light source device is arranged in the housing.

Preferably, the photoelectric conversion element is further used for obtaining a bright-field image inside the housing within the preset acquisition duration after turning the light source device in the darkroom space on with the biological sample film is not inserted into the housing;
the image correction device is further used for performing correction processing on the second dark-field image according to the first dark-field image and the bright-field image to obtain a target image corresponding to the self-luminous object.

Preferably, the photoelectric conversion element is further used for obtaining a corresponding bright-field image within the preset acquisition duration when the biological sample is not inserted into the housing, the housing is in an open state, and a uniform bright field is provided by an external light source;
the image correction device is further used for performing correction processing on the second dark-field image according to the first dark-field image and the bright-field image to obtain a target image corresponding to the self-luminous object.

Preferably, the formula corresponding to the image correction device is further used for performing correction processing on the second dark-field image according to the first dark-field image and the bright-field image to obtain a target image corresponding to the self-luminous object is as follows:

$$I = \frac{I_0 - I_d}{I_f - I_d}$$

wherein I indicates pixel data corresponding to the target image, $I_0$ indicates pixel data corresponding to the second dark-field image, $I_d$ indicates pixel data corresponding to the first dark-field image, and $I_f$ indicates pixel data corresponding to the bright-field image.

Preferably, the housing comprises a shading cover and a base;
- one side of the shading cover and one side of the base are hinged;
- the inside of the housing forms a darkroom space when the shading cover and the base are closed.

Preferably, the light source device is arranged on the top position of the inner side of the shading cover; and/or,
- the corresponding lighting duration after the light source device is turned on is 10 ms-30 s; and/or,
- the light source device comprises a number of LED (light-emitting diode) lamp beads arranged as dots array, a number of lights led by optical fiber, a number of modulator tubes arrange in parallel, or a number of plate shaped lights.

Preferably, the imaging apparatus further comprises a diffuser;
- the diffuser is arranged fixedly on the inner side of the shading cover and directly under the light source device; and/or,
- the photoelectric conversion element comprises a CMOS (Complementary Metal Oxide Semiconductor) chip, a CCD (Charge-coupled Device) chip or an amorphous silicon photoelectric conversion detector; and/or,
- the biological sample film comprises a protein film, an agarose gel block, an agarose gel strip, a polyacrylamide gel block or a polyacrylamide gel strip.

Preferably, the imaging apparatus further comprises a protective film;
- two sides of the protective film are respectively fitted with the biological sample film and the photoelectric conversion element.

Preferably, the thickness of the protective film is 0.01 mm-0.02 mm; and/or,
- the material of the protective film is tempered glass film or rigid plastics film.

The present disclosure also provides an imaging method for self-luminous object on a biological sample film, which is implemented by the imaging apparatus for self-luminous object on a biological sample film mentioned above, the imaging method comprises:
- obtaining a first dark-field image inside the housing within a preset acquisition duration by using the photoelectric conversion element;
- obtaining a second dark-field image inside the housing within the preset acquisition duration by using the photoelectric conversion element after affixing the biological sample film to the surface of the photoelectric conversion element;
- wherein the biological sample film carries self-luminous object;
- performing correction processing on the second dark-field image according to the first dark-field image to obtain a target image corresponding to the self-luminous object.

Preferably, the formula corresponding to said performing correction processing on the second dark-field image according to the first dark-field image to obtain a target image corresponding to the self-luminous object is as follows:

$$I = I_0 - I_d$$

wherein I indicates pixel data corresponding to the target image, $I_0$ indicates pixel data corresponding to the second dark-field image, and $I_d$ indicates pixel data corresponding to the first dark-field image.

Preferably, the imaging apparatus further comprises a light source device;
- before the step of performing correction processing on the second dark-field image according to the first dark-field image to obtain a target image corresponding to the self-luminous object, the method further comprises:
- obtaining a bright-field image inside the housing within the preset acquisition duration after turning the light source device in the darkroom space on with the biological sample film is not inserted into the housing;
- the step of performing correction processing on the second dark-field image according to the first dark-field image to obtain a target image corresponding to the self-luminous object comprises:
- performing correction processing on the second dark-field image according to the first dark-field image and the bright-field image to obtain a target image corresponding to the self-luminous object.

Preferably, before the step of performing correction processing on the second dark-field image according to the first dark-field image to obtain a target image corresponding to the self-luminous object, the method further comprises:
- obtaining a corresponding bright-field image within the preset acquisition duration when the biological sample is not inserted into the housing, the housing is in an open state, and a uniform bright field is provided by an external light source;
- the step of performing correction processing on the second dark-field image according to the first dark-field image to obtain a target image corresponding to the self-luminous object comprises:
- performing correction processing on the second dark-field image according to the first dark-field image and the bright-field image to obtain a target image corresponding to the self-luminous object.

Preferably, the formula corresponding to said performing correction processing on the second dark-field image according to the first dark-field image and the bright-field image to obtain a target image corresponding to the self-luminous object is as follows:

$$I = \frac{I_0 - I_d}{I_f - I_d}$$

wherein I indicates pixel data corresponding to the target image, $I_0$ indicates pixel data corresponding to the second dark-field image, $I_d$ indicates pixel data corresponding to the first dark-field image, and $I_f$ indicates pixel data corresponding to the bright-field image.

The positive progress effects of the present disclosure are: a darkroom is formed inside the housing of the imaging apparatus in the present disclosure; the photoelectric conversion element obtains the first dark-field image first as the self-luminous object is not inserted into the darkroom, and obtains the second dark-field image after the self-luminous object is inserted, then the second dark-field image is corrected according to the first dark-field image, to obtain a target image corresponding to the self-luminous object; in addition, it can effectively and more accurately obtain a higher-definition target image of the self-luminous object by the bright-field image on the light field generated by the light source in the housing or by an external light source; the operation process is simple and the time required for imaging is short; furthermore, the imaging apparatus has the advantages of a small structure, low cost of manufacture, convenient operation, portability, and the like.

DETAILED DESCRIPTION

The following embodiments further illustrate the present disclosure, but the present disclosure is not limited thereto.

Embodiment 1

Figure 1:
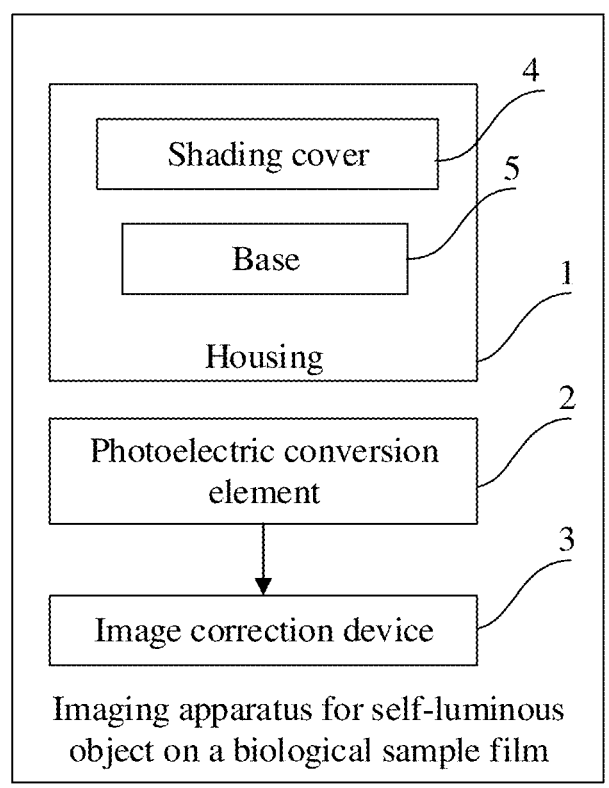
FIG. 1 is a first structure schematic diagram of the imaging apparatus for self-luminous object on a biological sample film according to Embodiment 1 in the present.
Figure 2:
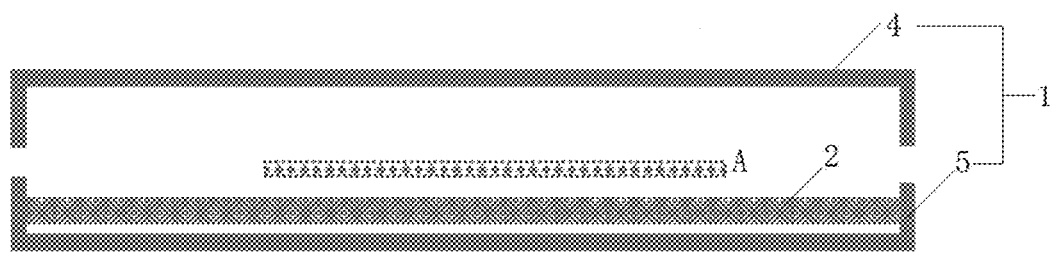
FIG. 2 is a second structure schematic diagram of the imaging apparatus for self-luminous object on a biological sample film according to Embodiment 1 in the present.

As shown in FIG. 1 and FIG. 2, the imaging apparatus for self-luminous object on a biological sample film in this embodiment comprises housing 1, photoelectric conversion element 2 and image correction device 3.

Figure 3:
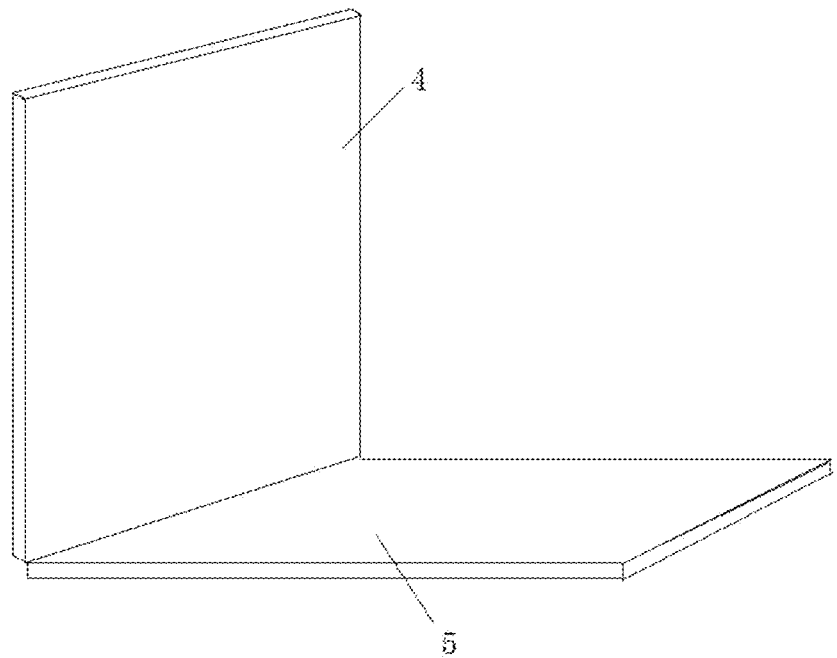
FIG. 3 is a first housing structure schematic diagram of the imaging apparatus for self-luminous object on a biological sample film according to Embodiment 1 in the present.

The inside of housing 1 forms a darkroom space, wherein housing 1 comprises shading cover 4 and base 5. As shown in FIG. 3, one side of shading cover 4 and one side of base 5 are hinged, and shading cover 4 is in an open state at the moment.

Figure 4:
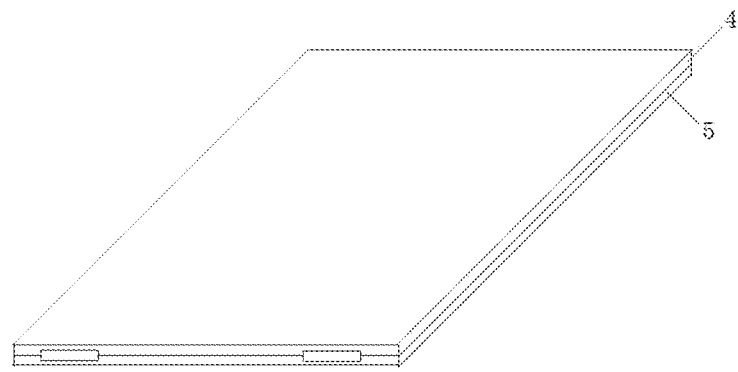
FIG. 4 is a second housing structure schematic diagram of the imaging apparatus of self-luminous object on a biological sample film according to Embodiment 1 in the present.

As shown in FIG. 4, the inside of housing 1 forms a dark field space when shading cover 4 and base 5 are closed, so as to ensure an effective acquisition for weak signals corresponding to the self-luminous object on a biological sample film (represented by A in FIG. 2).

Wherein the biological sample film comprises a protein film, an agarose gel block, an agarose gel strip, a polyacrylamide gel block, a polyacrylamide gel strip or the like.

The photoelectric conversion element is arranged in the housing, wherein the photoelectric conversion element comprises a CMOS chip, a CCD chip, an amorphous silicon photoelectric conversion detector or the like.

Figure 5:
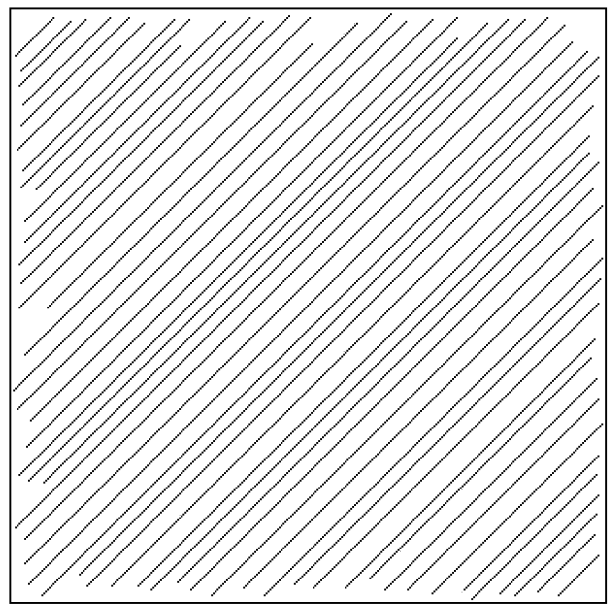
FIG. 5 is a first dark-field imaging schematic diagram of the imaging apparatus of self-luminous object on a biological sample film according to Embodiment 1 in the present.

The photoelectric conversion element is used for obtaining a first dark-field image (as shown in FIG. 5) inside the housing within a preset acquisition duration as the biological sample film A is not inserted;
wherein the biological sample film carries self-luminous object.

The preset acquisition duration can be set and adjusted according to the factual situation, and preferably, the preset acquisition duration is 1 s.

Specifically, when the biological sample film comprises a protein film, the protein film sample is separated by SDS-PAGE (Sodium dodecyl sulfonate-polyacrylamide gel) electrophoretic technology, then the protein is transferred to a PVDF (polyvinylidene fluoride) film in a buffer solution to obtain the biological sample film carrying protein. The biological sample film sequentially completes the target protein-specific primary antibody incubation and horseradish peroxidase-coupled secondary antibody incubation. After that, a chemical illuminant solution is used for coloration (to be shown as the self-luminous object) to generate chemically optical signals in the target protein area.

Figure 6:
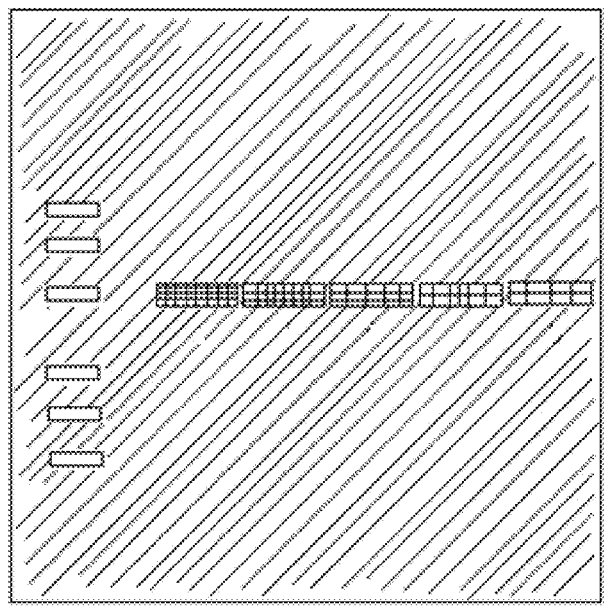
FIG. 6 is a second dark-field imaging schematic diagram of the imaging apparatus of self-luminous object on a biological sample film according to Embodiment 1 in the present.

The photoelectric conversion element is further used for obtaining a second dark-field image inside the housing within the preset acquisition duration after affixing the biological sample film to the surface of the photoelectric conversion element (as shown in FIG. 6), that implies, the data acquisition durations corresponding to the first dark-field image and the second dark-field image are the same.

The image correction device is used for performing correction processing on the second dark-field image according to the first dark-field image to obtain a target image corresponding to the self-luminous object.

The process of obtaining the first dark-field image with the photoelectric conversion element comprises:
opening shading cover 4, and removing the residual stain and the like on the objective table (i.e. the photoelectric conversion element);
closing shading cover 4, such that the inside of the housing forms a darkroom space to ensure the photoelectric conversion element is protected from external optical signals;
waiting for a preset time (such as 1 s), and acquiring the numerical value $I_d$ of each pixel in the uniform dark field inside the housing by using the photoelectric conversion element, wherein the acquisition duration is 1 s.

The process of obtaining the second dark-field image with the photoelectric conversion element comprises:

opening shading cover 4, and positioning the biological sample film carrying self-luminous object on the objective table (i.e. the photoelectric conversion element), such that the biological sample film fits with the photoelectric conversion element tightly;

closing shading cover 4, such that the inside of the housing forms a darkroom space to ensure the photoelectric conversion element is protected from external optical signals;

acquiring the optical signals corresponding to self-luminous object (the target protein) on the biological sample by using the photoelectric conversion element (at the moment, other areas except the target protein belong to the uniform dark field), and the photoelectric conversion element acquires the numerical value $I_0$ of each pixel inside the housing, wherein the acquisition duration is 1 s.

Wherein, the formula corresponding to the image correction device is used for performing correction processing on the second dark-field image according to the first dark-field image to obtain a target image corresponding to the self-luminous object is as follows:

$$I = I_0 - I_d$$

wherein I indicates pixel data corresponding to the target image, $I_0$ indicates pixel data corresponding to the second dark-field image, and $I_d$ indicates pixel data corresponding to the first dark-field image.

The second dark-field image has the same size with the first dark-field image, and the difference value of $I_0-I_d$ represents the difference value between the pixel values at the same point in the two images.

In this embodiment, a darkroom is formed inside the housing of the imaging apparatus; the photoelectric conversion element obtains the first dark-field image first as the self-luminous object is not inserted into the darkroom, and the photoelectric conversion element obtains the second dark-field image after the self-luminous object is inserted, then the second dark-field image is corrected according to the first dark-field image to obtain a target image corresponding to the self-luminous object, such that a higher-definition target image of the self-luminous object is obtained by contact imaging method; the operation process is simple and the time required for imaging is short; furthermore, the imaging apparatus has the advantages of a small structure, low cost of manufacture, convenient operation, portability, and the like.

Embodiment 2

Figure 7:
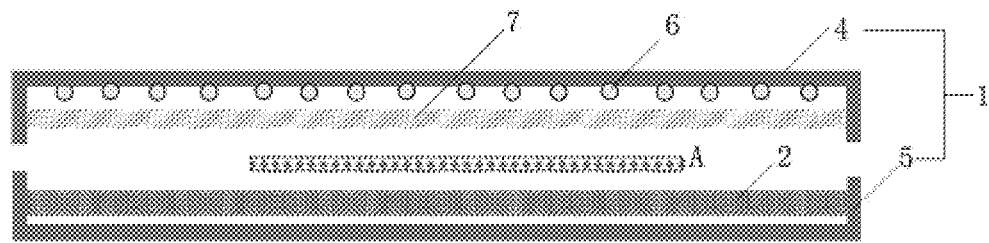
FIG. 7 is a first structure schematic diagram of the imaging apparatus for self-luminous object on a biological sample film according to Embodiment 2 in the present.

As shown in FIG. 7, the imaging apparatus for self-luminous object on a biological sample film in this embodiment is a further improvement based on Embodiment 1, specifically:

the imaging apparatus further comprises light source device 6, light source device 6 is arranged in the housing 1.

Light source device 6 is arranged on the top position of the inner side of shading cover 4;

the corresponding lighting duration after light source device 6 is turned on is 10 ms-30 s, and the lighting duration can be adjusted according to the factual situation.

Light source device 6 comprises a number of LED lamp beads arranged as dots array, a number of lights led by optical fiber, a number of modulator tubes arrange in parallel, a number of plate shaped lights or the like.

The imaging apparatus further comprises diffuser 7, which is fixedly arranged inside the shading cover and directly under the light source device, such that light source device 6 radiates evenly.

Figure 8:
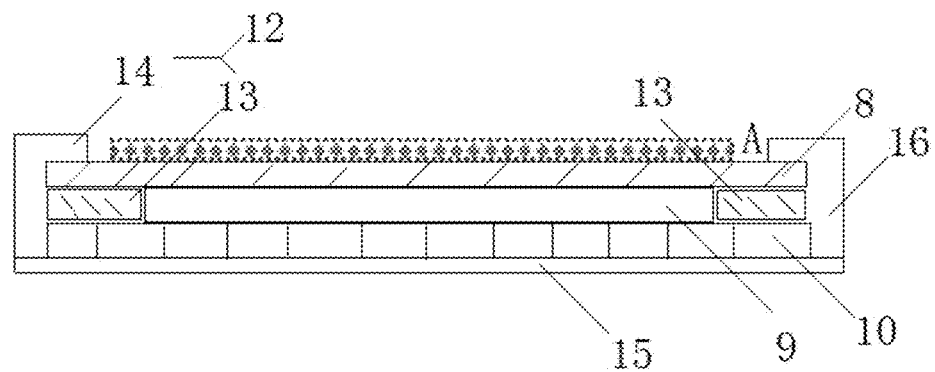
FIG. 8 is a second structure schematic diagram of the imaging apparatus for self-luminous object on a biological sample film according to Embodiment 2 in the present.

As shown in FIG. 8, the imaging apparatus further comprises protective film 8, the two sides of protective film 8 are respectively fitted with the biological sample film and the photoelectric conversion element.

Wherein, the thickness of the protective film is 0.01 mm-0.02 mm, and the material of the protective film is tempered glass film or rigid plastics film.

The outer edge of protective film 8 is located outside the outer edge of photoelectric conversion element 2.

Photoelectric conversion element 2 comprises detector body 9 and substrate 10, and the outer edge of substrate 10 is located outside the outer edge of detector body 9.

Wherein, the substrate is a mental plate, a PCBA (a circuit board production process) board or the like.

Figure 9:
FIG. 9 is a third structure schematic diagram of the imaging apparatus for self-luminous object on a biological sample film according to Embodiment 2 in the present.

As shown in FIG. 9, the top of base 5 involves containing slot 11, photoelectric conversion element 2 and protective film 8 are located in the containing groove 11.

The imaging apparatus in the embodiment further comprises package 12, the package applied on protective film 8 and base 5 to limit the movement of photoelectric conversion 2 relative to base 5.

Specifically, package 12 comprises filler 13 and baffle 14.

Filler 13 is arranged in the area enclosed by the surfaces of photoelectric conversion element 2, protective film 8 and base 5, and is used for fixing photoelectric conversion element 2 on base 5.

Wherein, the filler is gel, glass powder, plastic embryo and the like.

When photoelectric conversion element 2 is packaged, baffle 14 abut against the edge of protective film 8 all around to ensure the stability of the entire apparatus.

Base 5 comprises bottom plate 15 and base body 16. Base body 16 is provided with containing groove 11, and containing groove 11 penetrates through base body 16. Bottom plate 15 is flexibly connected to the bottom of base body 16 to allow to open or close containing groove 11. The height of photoelectric conversion element 2 is not greater than the depth of containing groove 11.

Photoelectric conversion element 2 is further used for obtaining a bright-field image inside the housing within the preset acquisition duration after turning the light source device in the darkroom space on with the biological sample film is not inserted into the housing; that implies, the data acquisition durations corresponding to the first dark-field image and the second dark-field image are the same.

Figure 10:
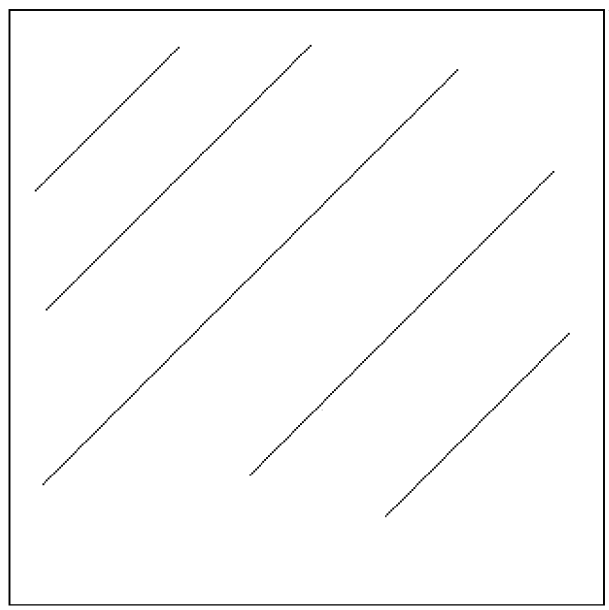
FIG. 10 is a bright-field imaging schematic diagram of the imaging apparatus for self-luminous object on a biological sample film according to Embodiment 2 in the present.

As shown in FIG. 10, the difference between this figure and of the first dark-field image in FIG. 5 is: the entire brightness of this figures is higher than that of the first dark-field image, wherein the less the number of slashes, the higher the corresponding brightness.

Image correction device 3 is further used for performing correction processing on the second dark-field image according to the first dark-field image and the bright-field image to obtain a target image corresponding to the self-luminous object.

The process of obtaining the bright-field image with the photoelectric conversion element comprises:

opening shading cover 4, and removing the residual stain and the like on the objective table (i.e. the photoelectric conversion element);

closing shading cover 4, such that the inside of the housing constitutes a darkroom space to ensure the photoelectric conversion element is protected from external optical signals;

controlling the light source device on (the corresponding lighting duration is 10 ms-30 s), and acquiring the numerical value $I_{f1}$ of each pixel in the uniform bright field synchronously by using photoelectric conversion element 2, wherein the acquisition duration is 1 s.

Thus, the formula corresponding to the image correction device is further used for performing correction processing on the second dark-field image according to the first dark-field image and the bright-field image to obtain a target image corresponding to the self-luminous object, and the corresponding equation is as follows:

$$I = \frac{I_0 - I_d}{I_{f1} - I_d}$$

wherein I indicates pixel data corresponding to the target image, $I_0$ indicates pixel data corresponding to the second dark-field image, $I_d$ indicates pixel data corresponding to the first dark-field image, and $I_{f1}$ indicates pixel data corresponding to the bright-field image obtained from the light field provided by a white-light source in the imaging apparatus.

The sizes of the second dark-field image, the first-dark field image, and the bright-field image are the same, the difference values of both $I_0-I_d$ and $I_{f1}-I_d$ are direct at the same pixel point in the two images, and the ratio I is the percentage of signal strength corresponding to each pixel point.

Figure 11:
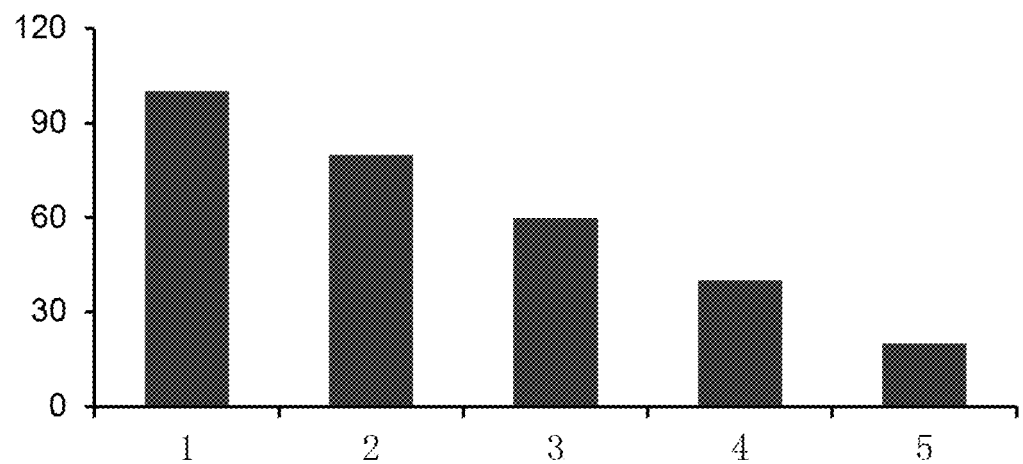
FIG. 11 is a schematic diagram of the relationship between lane and signal strength in the imaging apparatus for self-luminous object on a biological sample film according to Embodiment 2 in the present.
Figure 12:
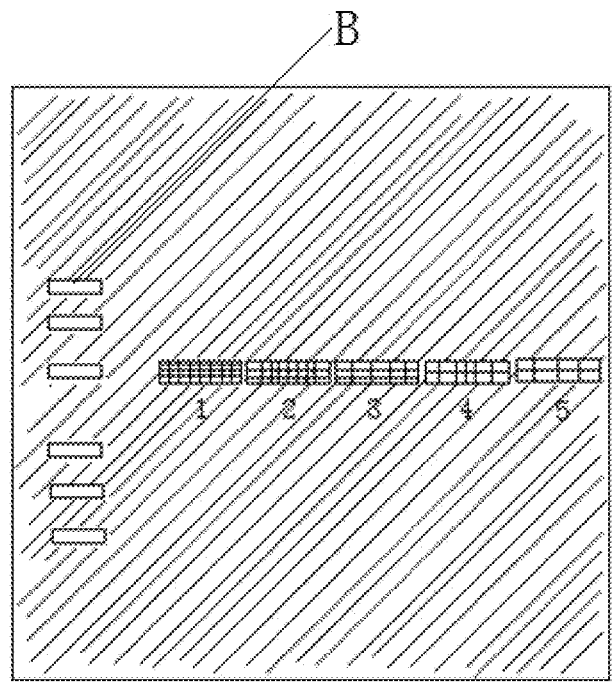
FIG. 12 is a second dark-field imaging schematic diagram of the imaging apparatus of self-luminous object on a biological sample film according to Embodiment 2 in the present.

Specifically, as shown in FIG. 11, the abscissa axis indicates lanes (1-5), and the ordinate axis indicates the percentage of signal strength for each lane (unit: %), decreasing from left to right. Selecting every lane in the biological sample film, and calculating the signal value of each lane, and comparing the signal strength of target protein in each lane based on these signal values, wherein the larger the signal value, the stronger the signal strength of the target protein in the corresponding lane, and the darker the color display (i.e., display more clearly). As shown in FIG. 12, from left to right (lanes 1-5) are the locations of the target proteins, i.e., the locations of the self-luminous object, of which the signal strength decreases gradually, and the displayed color becomes lighter gradually. In addition, area B indicates the area involving markers of pre-colored molecular weight sample.

Thus, based on the signal values obtained by data processing, a more accurate target image of the target protein intensity (i.e., the self-luminous object) on the biological sample film can be obtained.

In this embodiment, a darkroom is formed inside the housing of the imaging apparatus; the photoelectric conversion element obtains the first dark-field image first as the self-luminous object is not inserted into the darkroom, and the photoelectric conversion element obtains the second dark-field image after the self-luminous object is inserted, then the second dark-field image is corrected according to the first dark-field image to obtain a target image corresponding to the self-luminous object. In addition, a higher-definition target image of the self-luminous object can be obtained effectively and more accurately by the bright-field image on the light field generated by the light source in the housing; the operation process is simple and the time required for imaging is short; furthermore, the imaging apparatus has the advantages of a small structure, low cost of manufacture, convenient operation, and portability.

Embodiment 3

The imaging apparatus for self-luminous object on a biological sample film in this embodiment is a further improvement based on Embodiment 1, specifically:

the imaging apparatus comprises light source device 6 in Embodiment 2.

Photoelectric conversion element 2 is further used for obtaining a corresponding bright-field image within the preset acquisition duration when the biological sample film is not inserted and the uniform light field is from the external light source, that implies, the data acquisition durations corresponding to the first dark-field image, the second dark-field image, and the bright-field image are the same;

image correction device 3 is further used for performing correction processing on the second dark-field according to the first dark-field image and the bright-field image to obtain a target image corresponding to the self-luminous object. As shown in FIG. 10, the difference between the target image and the first dark-field image is: the overall brightness of the target image is higher than that of the first dark-field image.

Figure 13:
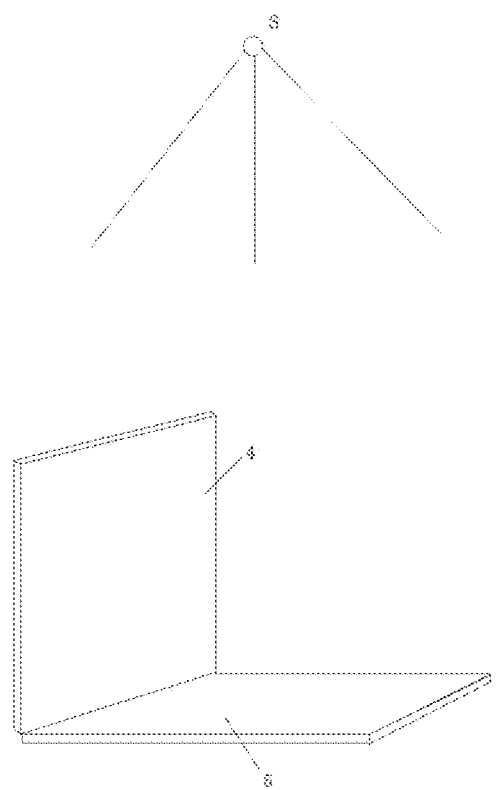
FIG. 13 is a structure schematic diagram of the imaging apparatus for self-luminous object on a biological sample film according to Embodiment 3 in the present.

The process of obtaining the light-field image with the photoelectric conversion element comprises:

opening the shading cover 4, and removing the residual stain and the like on the objective table (i.e., the photoelectric conversion element);

as shown in FIG. 13, in an open space, an external light source (top light S) is arranged above the imaging apparatus directly and 2 meters away from the imaging apparatus;

waiting for 1 minute, then acquiring the numerical value $I_{f2}$ of each pixel in the uniform bright field with the photoelectric conversion element.

Thus, performing correction processing on the second dark-field image according to the first dark-field image and the bright-field image to obtain a target image corresponding to the self-luminous object by the image correction device corresponds to a formula as follows:

$$I = \frac{I_0 - I_d}{I_{f2} - I_d}$$

wherein the I indicates pixel data corresponding to the target image, $I_0$ indicates pixel data corresponding to the second dark-field image, $I_d$ indicates pixel data corresponding to the first dark-field image, and $I_{f2}$ indicates pixel data corresponding to the bright-field image.

The sizes of the second dark-field image, the first-dark field image, and the bright-field image are the same, the difference values of both $I_0-I_d$ and $I_{f2}-I_d$ are direct at the same pixel point in the two images, and the ratio I is the percentage of signal strength corresponding to each pixel point.

Specifically, as shown in FIG. 11, the abscissa axis indicates lanes (1-5), and the ordinate axis indicates the percentage of signal strength for each lane (unit: %), decreasing from left to right. Select every lane in the biological sample film, calculate the signal value of each lane, and compare the signal strength of target protein in each lane based on these signal values, wherein the larger the signal value, the stronger the signal strength of the target protein in the corresponding lane, and the darker the color display (i.e., display more clearly). As shown in FIG. 12, from left to right (lanes 1-5) are the locations of the target proteins, i.e., the locations of the self-luminous object, of which the signal strength decreases gradually, and the displayed color becomes lighter gradually. In addition, area B indicates the area involving markers of pre-colored molecular weight sample.

Thus, based on the signal values obtained by data processing, a more accurate target image of the target protein intensity (i.e., the self-luminous object) on the biological sample film can be obtained.

In this embodiment, a darkroom is formed inside the housing of the imaging apparatus; the photoelectric conversion element obtains the first dark-field image first as the self-luminous object is not inserted into the darkroom, and the photoelectric conversion element obtains the second dark-field image after the self-luminous object is inserted, then the second dark-field image is corrected according to the first dark-field image to obtain a target image corresponding to the self-luminous object. In addition, a higher-definition target image of the self-luminous object can be obtained effectively and more accurately by the bright-field image on the light field generated by the external light source; the operation process is simple and the time required for imaging is short; furthermore, the imaging apparatus has the advantages of a small structure, low cost of manufacture, convenient operation, and portability.

Embodiment 4

Figure 14:
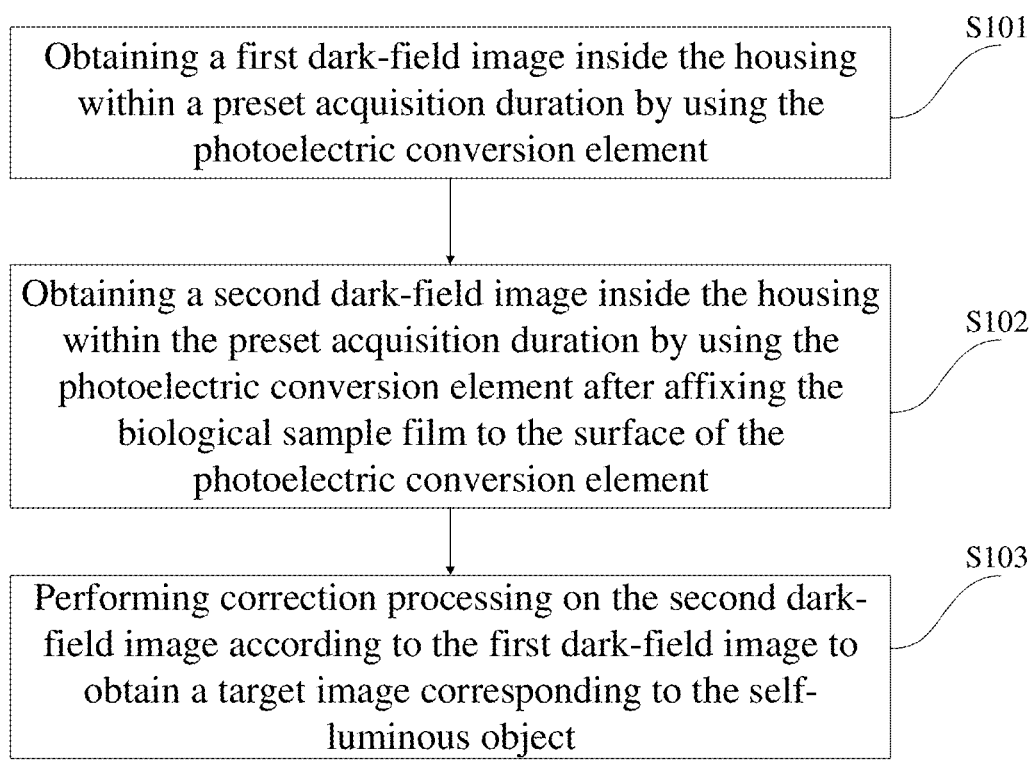
FIG. 14 is a flow chart diagram of the imaging method for self-luminous object on a biological sample film according to Embodiment 4 in the present.

As shown in FIG. 14, the imaging method for self-luminous object on a biological sample film in this embodiment is implemented according to the imaging apparatus for self-luminous object on a biological sample film in Embodiment 1, and the imaging method comprises the following steps:

S101, obtaining a first dark-field image inside the housing within a preset acquisition duration by using the photoelectric conversion element;

the preset acquisition duration can be set and adjusted according to the factual situation, and preferably, the preset acquisition duration is 1 s.

S102, obtaining a second dark-field image inside the housing within the preset acquisition duration by using the photoelectric conversion element after affixing the biological sample film to the surface of the photoelectric conversion element, that implies, the data acquisition durations corresponding to the first dark-field image, the second dark-field image are the same;

wherein the biological sample film carries self-luminous object;

S103, performing correction processing on the second dark-field image according to the first dark-field image to obtain a target image corresponding to the self-luminous object.

The corresponding formula of step S103 is:

$$I = I_0 - I_d$$

wherein I indicates pixel data corresponding to the target image, $I_0$ indicates pixel data corresponding to the second dark-field image, and $I_d$ indicates pixel data corresponding to the first dark-field image.

The second dark-field image has the same size with the first dark-field image, and the difference value of $I_0-I_d$ represents the difference value between the pixel values at the same point in the two images.

In this embodiment, a darkroom is constituted inside the housing of the imaging apparatus; the photoelectric conversion element obtains the first dark-field image first as the self-luminous object is not inserted into the darkroom, and the photoelectric conversion element obtains the second dark-field image after the self-luminous object is inserted, then the second dark-field image is corrected according to the first dark-field image to obtain a target image corresponding to the self-luminous object, such that a higher-definition target image of the self-luminous object is obtained; the operation process is simple and the time required for imaging is short; furthermore, the imaging apparatus has the advantages of a small structure, low cost of manufacture, convenient operation, portability, and the like.

Embodiment 5

Figure 15:
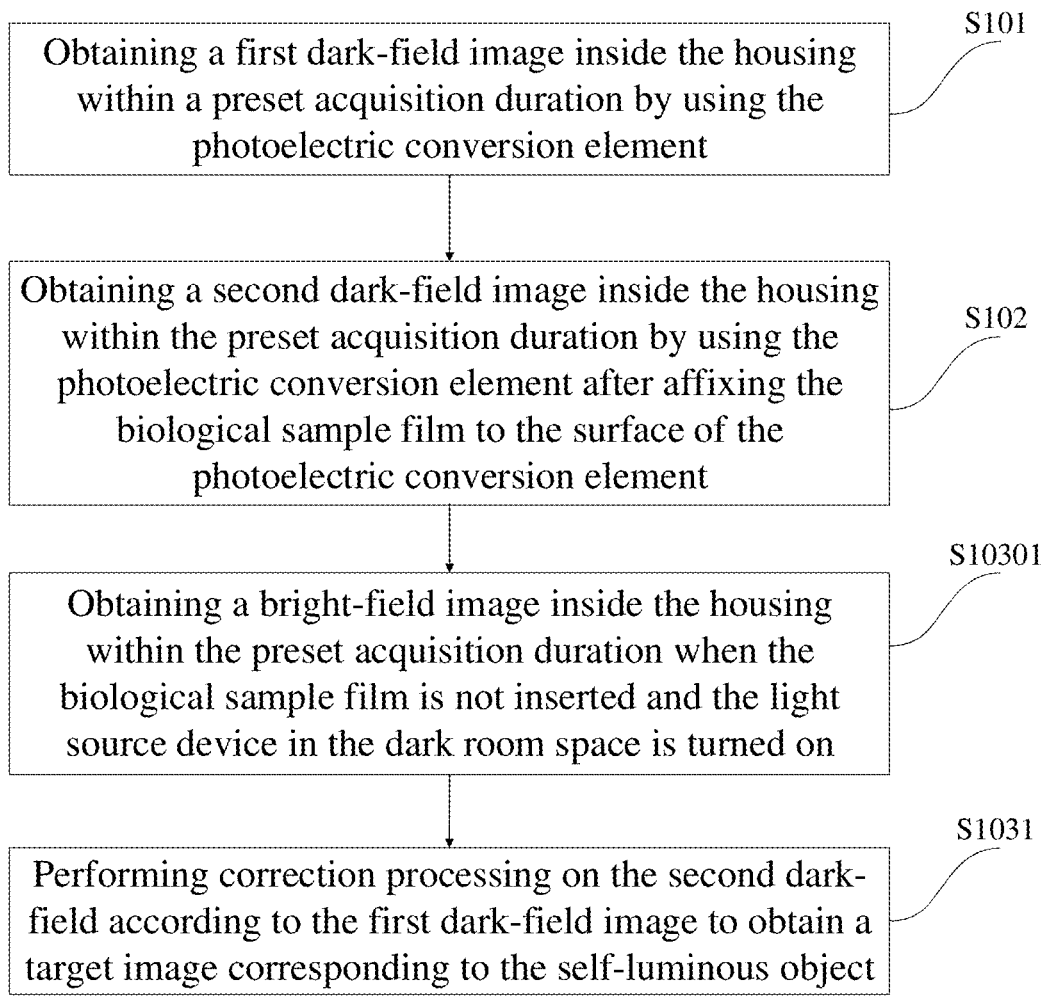
FIG. 15 is a flow chart diagram of the imaging method for self-luminous object on a biological sample film according to Embodiment 5 in the present.

As shown in FIG. 15, the imaging method for self-luminous object on a biological sample film in this embodiment is implemented according to the imaging apparatus for self-luminous object on a biological sample film in Embodiment 2, and the imaging apparatus for self-luminous object on a biological sample film in this embodiment is a further improvement based on Embodiment 4, specifically:

after step S102 and before step S103, the method further comprises the following step:

S10301, obtaining a bright-field image inside the housing within the preset acquisition duration when the biological sample film is not inserted and the light source device in the dark room space is turned on, that implies, the data acquisition durations corresponding to the first dark-field image, the second dark-field image, and the bright-field image are the same;

step S103 comprises the following step:

S1031, performing correction processing on the second dark-field according to the first dark-field image to obtain a target image corresponding to the self-luminous object. The corresponding formula of step S1031 is as follows:

$$I = \frac{I_0 - I_d}{I_{f1} - I_d}$$

wherein the I indicates pixel data corresponding to the target image, $I_0$ indicates pixel data corresponding to the second dark-field image, $I_d$ indicates pixel data corresponding to the first dark-field image, and $I_f$ indicates pixel data corresponding to the bright-field image.

The sizes of the second dark-field image, the first-dark field image and the bright-field image are the same, the difference values of both $I_0-I_d$ and $I_{f1}-I_d$ are direct at the same pixel point in the two images, and the ratio I is the percentage of signal strength corresponding to each pixel point.

Specifically, as shown in FIG. 11, the abscissa axis indicates lanes (1-5), and the ordinate axis indicates the percentage of signal strength for each lane (unit: %), decreasing from left to right. Select every lane in the biological sample film, calculate the signal value of each lane, and compare the signal strength of target protein in each lane based on these signal values, wherein the larger the signal value, the stronger the signal strength of the target protein in the corresponding lane, and the darker the color display (i.e., display more clearly). As shown in FIG. 12, from left to right (lanes 1-5) are the locations of the target proteins, i.e., the locations of the self-luminous object, of which the signal strength decreases gradually, and the displayed color becomes lighter gradually. In addition, area B indicates the area involving markers of pre-colored molecular weight sample.

Thus, based on the signal values obtained by data processing, a more accurate target image of the target protein intensity (i.e., the self-luminous object) on the biological sample film can be obtained.

In this embodiment, a darkroom is constituted inside the housing of the imaging apparatus; the photoelectric conversion element obtains the first dark-field image first as the self-luminous object is not inserted into the darkroom, and the photoelectric conversion element obtains the second dark-field image after the self-luminous object is inserted, then the second dark-field image is corrected according to the first dark-field image to obtain a target image corresponding to the self-luminous object. In addition, a higher-definition target image of the self-luminous object can be obtained effectively and more accurately by the bright-field image on the light field generated by the light source in the housing; the operation process is simple and the time required for imaging is short; furthermore, the imaging apparatus has the advantages of a small structure, low cost of manufacture, convenient operation, and portability.

Embodiment 6

Figure 16:
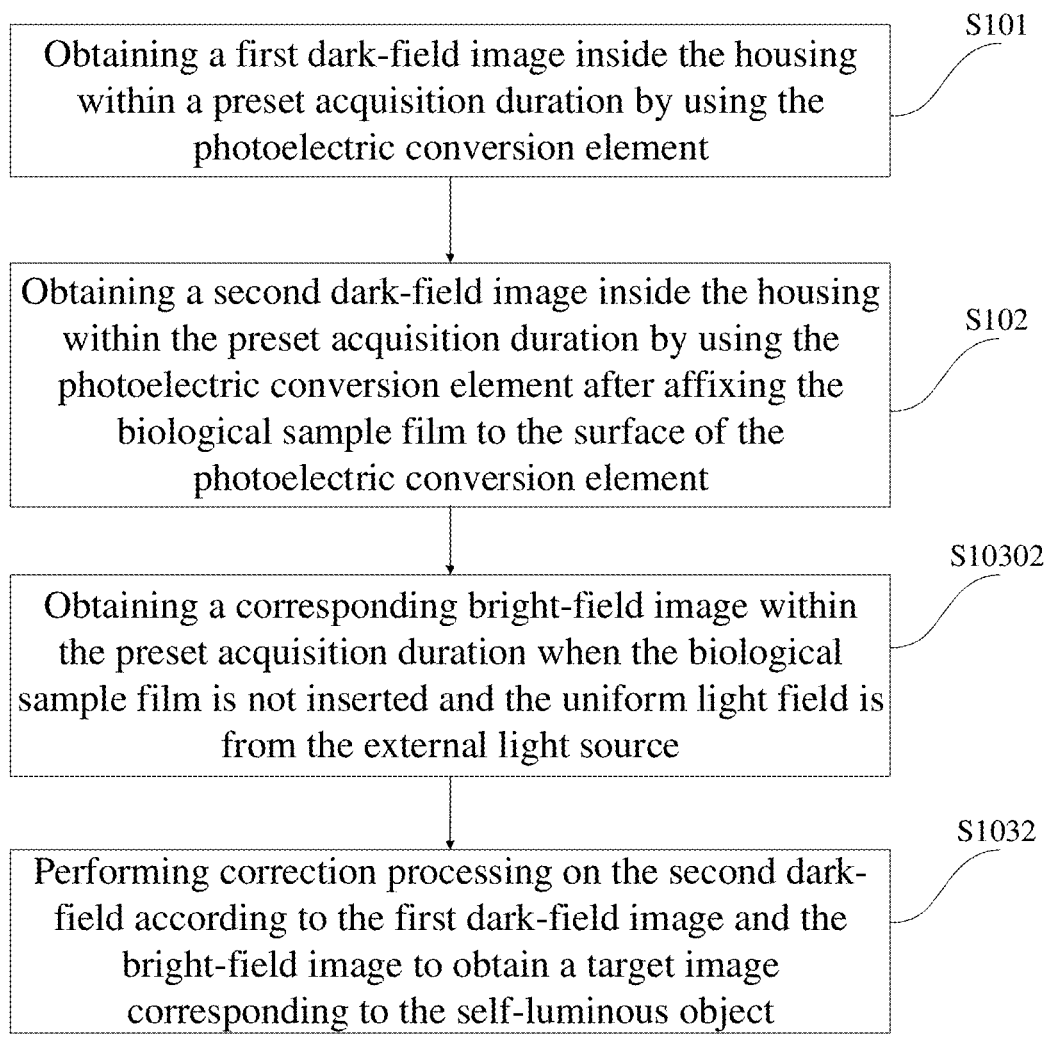
FIG. 16 is a flow chart diagram of the imaging method for self-luminous object on a biological sample film according to Embodiment 6 in the present.

As shown in FIG. 16, the imaging method for self-luminous object on a biological sample film in this embodiment is implemented according to the imaging apparatus for self-luminous object on a biological sample film in Embodiment 3, and the imaging apparatus for self-luminous object on a biological sample film in this embodiment is a further improvement based on Embodiment 4, specifically:

after step S102 and before step S103, the method further comprises the following step:

S10302, obtaining a corresponding bright-field image within the preset acquisition duration when the biological sample film is not inserted and the uniform light field is from the external light source, that implies, the data acquisition durations corresponding to the first dark-field image, the second dark-field image, and the bright-field image are the same;

the step S103 comprises the following step:

S1032, performing correction processing on the second dark-field according to the first dark-field image and the bright-field image to obtain a target image corresponding to the self-luminous object.

The corresponding formula of step S1032 is as follows:

$$I = \frac{I_0 - I_d}{I_{f2} - I_d}$$

wherein the I indicates pixel data corresponding to the target image, $I_0$ indicates pixel data corresponding to the second dark-field image, $I_d$ indicates pixel data corresponding to the first dark-field image, and $I_f$ indicates pixel data corresponding to the bright-field image.

The sizes of the second dark-field image, the first-dark field image and the bright-field image are the same, the difference values of both $I_0-I_d$ and $I_{f2}-I_d$ are direct at the same pixel point in the two images, and the ratio I is the percentage of signal strength corresponding to each pixel point.

Specifically, as shown in FIG. 11, the abscissa axis indicates lanes (1-5), and the ordinate axis indicates the percentage of signal strength for each lane (unit: %), decreasing from left to right. Select every lane in the biological sample film, calculate the signal value of each lane, and compare the signal strength of target protein in each lane based on these signal values, wherein the larger the signal value, the stronger the signal strength of the target protein in the corresponding lane, and the darker the color display (i.e., display more clearly). As shown in FIG. 12, from left to right (lanes 1-5) are the locations of the target proteins, i.e., the locations of the self-luminous object, of which the signal strength decreases gradually, and the displayed color becomes lighter gradually. In addition, area B indicates the area involving markers of pre-colored molecular weight sample.

Thus, based on the signal values obtained by data processing, a more accurate target image of the target protein intensity (i.e., the self-luminous object) on the biological sample film can be obtained.

In this embodiment, a darkroom is constituted inside the housing of the imaging apparatus; the photoelectric conversion element obtains the first dark-field image first as the self-luminous object is not inserted into the darkroom, and the photoelectric conversion element obtains the second dark-field image after the self-luminous object is inserted, then the second dark-field image is corrected according to the first dark-field image to obtain a target image corresponding to the self-luminous object. In addition, a higher-definition target image of the self-luminous object can be obtained effectively and more accurately by the bright-field image on the light field generated by the external light source; the operation process is simple and the time required for imaging is short; furthermore, the imaging apparatus has the advantages of a small structure, low cost of manufacture, convenient operation, and portability.

Although the embodiments of the present disclosure are described above, those skilled in the art should understand that these are only examples, and they can make various changes or modifications to these embodiments without departing from the principle and essence of the present disclosure. Therefore, the protection scope of the present disclosure is defined by the appended claims.

What is claimed is:

1. An imaging apparatus for self-luminous object on a biological sample film, which is characterized in that the imaging apparatus comprises a housing, a photoelectric conversion element, and an image correction device;

the inside of the housing forms a darkroom space;

the photoelectric conversion element is arranged in the housing;

the photoelectric conversion element is used for obtaining a first dark-field image inside the housing within a preset acquisition duration when the biological sample film is not inserted;

wherein the biological sample film carries a self-luminous object;

the photoelectric conversion element is further used for obtaining a second dark-field image inside the housing within the preset acquisition duration after affixing the biological sample film to the surface of the photoelectric conversion element;

the image correction device is used for performing correction processing on the second dark-field image according to the first dark-field image to obtain a target image corresponding to the self-luminous object;

wherein the imaging apparatus further comprises a light source device, the light source device is arranged in the housing;

wherein the photoelectric conversion element is further used for obtaining a bright-field image inside the housing within the preset acquisition duration after turning the light source device in the darkroom space on with the biological sample film is not inserted into the housing;

the image correction device is further used for performing correction processing on the second dark-field image according to the first dark-field image and the bright-field image to obtain a target image corresponding to the self-luminous object;

wherein the formula corresponding to the image correction device is further used for correcting the second dark-field image according to the first dark-field image and the bright-field image to obtain a target image corresponding to the self-luminous object is as follows:

$$I = \frac{I_0 - I_d}{I_f - I_d}$$

wherein I indicates pixel data corresponding to the target image, $I_0$ indicates pixel data corresponding to the second dark-field image, $I_d$ indicates pixel data corresponding to the first dark-field image, and if indicates pixel data corresponding to the bright-field image;

wherein the formula corresponding to the image correction device correcting the second dark-field image according to the first dark-field image to obtain a target image corresponding to the self-luminous object is as follows:

$$I = I_0 - I_d$$

wherein, I indicates pixel data corresponding to the target image, $I_0$ indicates pixel data corresponding to the second dark-field image, and $I_d$ indicates pixel data corresponding to the first dark-field image.

2. The imaging apparatus for self-luminous object on a biological sample film according to claim 1, wherein the housing comprises a shading cover and a base;
one side of the shading cover and one side of the base are hinged;
the inside of the housing forms a darkroom space when the shading cover and the base are closed.

3. The imaging apparatus for self-luminous object on a biological sample film according to claim 2, wherein the light source device is arranged on the top position of the inner side of the shading cover; and/or, the corresponding lighting duration after the light source device is turned on is 10 ms-30 s; and/or, the light source device comprises a number of LED lamp beads arranged as dots array, a number of lights led by optical fiber, a number of modulator tubes arrange in parallel, or a number of plate shaped lights.

4. The imaging apparatus for self-luminous object on a biological sample film according to claim 2, wherein the imaging apparatus further comprises a diffuser;
the diffuser is fixedly arranged on the inner side of the shading cover and directly under the light source device; and/or,
the photoelectric conversion element comprises a CMOS chip, a CCD chip or an amorphous silicon photoelectric conversion detector; and/or,
the biological sample film comprises a protein film, an agarose gel block, an agarose gel strip, a polyacrylamide gel block or a polyacrylamide gel strip.

5. The imaging apparatus for self-luminous object on a biological sample film according to claim 3, wherein the imaging apparatus further comprises a diffuser;
the diffuser is fixedly arranged on the inner side of the shading cover and directly under the light source device; and/or,
the photoelectric conversion element comprises a CMOS chip, a CCD chip or an amorphous silicon photoelectric conversion detector; and/or,
the biological sample film comprises a protein film, an agarose gel block, an agarose gel strip, a polyacrylamide gel block or a polyacrylamide gel strip.

6. The imaging apparatus for self-luminous object on a biological sample film according to claim 1, wherein the imaging apparatus further comprises a protective film;
two sides of the protective film are respectively fitted with the biological sample film and the photoelectric conversion element.

7. The imaging apparatus for self-luminous object on a biological sample film according to claim 6, wherein the thickness of the protective film is 0.01 mm-0.02 mm; and/or,
the material of the protective film is tempered glass film or rigid plastics film.

8. An imaging apparatus for self-luminous object on a biological sample film, which is characterized in that the imaging apparatus comprises a housing, a photoelectric conversion element, and an image correction device;
the inside of the housing forms a darkroom space;
the photoelectric conversion element is arranged in the housing;
the photoelectric conversion element is used for obtaining a first dark-field image inside the housing within a preset acquisition duration when the biological sample film is not inserted;
wherein the biological sample film carries a self-luminous object;
the photoelectric conversion element is further used for obtaining a second dark-field image inside the housing within the preset acquisition duration after affixing the biological sample film to the surface of the photoelectric conversion element;
the image correction device is used for performing correction processing on the second dark-field image according to the first dark-field image to obtain a target image corresponding to the self-luminous object;
wherein the photoelectric conversion element is further used for obtaining a corresponding bright-field image within the preset acquisition duration when the biological sample is not inserted into the housing, the housing is in an open state, and a uniform bright field is provided by an external light source;

the image correction device is further used for performing correction processing on the second dark-field image according to the first dark-field image and the bright-field image to obtain a target image corresponding to the self-luminous object;

wherein the formula corresponding to the image correction device is further used for correcting the second dark-field image according to the first dark-field image and the bright-field image to obtain a target image corresponding to the self-luminous object is as follows:

$$I = \frac{I_0 - I_d}{I_f - I_d}$$

wherein I indicates pixel data corresponding to the target image, $I_0$ indicates pixel data corresponding to the second dark-field image, $I_d$ indicates pixel data corresponding to the first dark-field image, and $I_f$ indicates pixel data corresponding to the bright-field image.

9. The imaging apparatus for self-luminous object on a biological sample film according to claim 8, wherein the formula corresponding to the image correction device correcting the second dark-field image according to the first dark-field image to obtain a target image corresponding to the self-luminous object is as follows:

$$I = I_0 - I_d$$

wherein, I indicates pixel data corresponding to the target image, $I_0$ indicates pixel data corresponding to the second dark-field image, and $I_d$ indicates pixel data corresponding to the first dark-field image.

10. The imaging apparatus for self-luminous object on a biological sample film according to at least one of claim 8, wherein the housing comprises a shading cover and a base;
one side of the shading cover and one side of the base are hinged;
the inside of the housing forms a darkroom space when the shading cover and the base are closed.

11. The imaging apparatus for self-luminous object on a biological sample film according to claim 8, wherein the imaging apparatus further comprises a protective film; two sides of the protective film are respectively fitted with the biological sample film and the photoelectric conversion element.

12. The imaging apparatus for self-luminous object on a biological sample film according to claim 11, wherein the thickness of the protective film is 0.01 mm-0.02 mm; and/or, the material of the protective film is tempered glass film or rigid plastics film.

13. An imaging method for self-luminous object on a biological sample film, which is characterized in that the imaging method is implemented by the imaging apparatus for self-luminous object on a biological sample film according to claim 1, the imaging method comprises:
obtaining a first dark-field image inside the housing within a preset acquisition duration by using the photoelectric conversion element;
obtaining a second dark-field image inside the housing within the preset acquisition duration by using the photoelectric conversion element after affixing the biological sample film to the surface of the photoelectric conversion element;
wherein the biological sample film carries a self-luminous object;
performing correction processing on the second dark-field image according to the first dark-field image to obtain a target image corresponding to the self-luminous object;
wherein the imaging apparatus further comprises a light source device;
before the step of performing correction processing on the second dark-field image according to the first dark-field image to obtain a target image corresponding to the self-luminous object, the method further comprises:
obtaining a bright-field image inside the housing within the preset acquisition duration after turning the light source device in the darkroom space on with the biological sample film is not inserted into the housing;
the step of performing correction processing on the second dark-field image according to the first dark-field image to obtain a target image corresponding to the self-luminous object comprises:
performing correction processing on the second dark-field image according to the first dark-field image and the bright-field image to obtain a target image corresponding to the self-luminous object;
wherein the formula corresponding to said performing correction processing on the second dark-field image according to the first dark-field image and the bright-field image to obtain a target image corresponding to the self-luminous object is as follows:

$$I = I_0 - I_d$$

Wherein, I indicates pixel data corresponding to the target image, $I_0$ indicates pixel data corresponding to the second dark-field image, $I_d$ indicates pixel data corresponding to the first dark-field image, and $I_f$ indicates pixel data corresponding to the bright-field image.

14. The imaging method for self-luminous object on a biological sample film according to claim 13, wherein the formula corresponding to said performing correction processing on the second dark-field image according to the first dark-field image to obtain a target image corresponding to the self-luminous object is as follows:

$$I = I_0 - I_d$$

wherein I indicates pixel data corresponding to the target image, $I_0$ indicates pixel data corresponding to the second dark-field image, and $I_d$ indicates pixel data corresponding to the first dark-field image.

15. An imaging method for self-luminous object on a biological sample film, which is characterized in that the imaging method is implemented by the imaging apparatus for self-luminous object on a biological sample film according to claim 1, the imaging method comprises:
obtaining a first dark-field image inside the housing within a preset acquisition duration by using the photoelectric conversion element;
obtaining a second dark-field image inside the housing within the preset acquisition duration by using the photoelectric conversion element after affixing the biological sample film to the surface of the photoelectric conversion element;

wherein the biological sample film carries a self-luminous object;
performing correction processing on the second dark-field image according to the first dark-field image to obtain a target image corresponding to the self-luminous object;
wherein before the step of performing correction processing on the second dark-field image according to the first dark-field image to obtain a target image corresponding to the self-luminous object, the method further comprises:
obtaining a corresponding bright-field image within the preset acquisition duration when the biological sample is not inserted into the housing, the housing is in an open state, and an uniform bright field is provided by an external light source;
the step of performing correction processing on the second dark-field image according to the first dark-field image to obtain a target image corresponding to the self-luminous object comprises:
performing correction processing on the second dark-field image according to the first dark-field image and the bright-field image to obtain a target image corresponding to the self-luminous object;
wherein the formula corresponding to said performing correction processing on the second dark-field image according to the first dark-field image and the bright-field image to obtain a target image corresponding to the self-luminous object is as follows:

$$I = \frac{I_0 - I_d}{I_f - I_d}$$

Wherein, I indicates pixel data corresponding to the target image, $I_0$ indicates pixel data corresponding to the second dark-field image, $I_d$ indicates pixel data corresponding to the first dark-field image, and $I_f$ indicates pixel data corresponding to the bright-field image.

16. The imaging method for self-luminous object on a biological sample film according to claim 15, wherein the formula corresponding to said performing correction processing on the second dark-field image according to the first dark-field image to obtain a target image corresponding to the self-luminous object is as follows:

$$I = I_0 - I_d$$

wherein I indicates pixel data corresponding to the target image, $I_0$ indicates pixel data corresponding to the second dark-field image, and $I_d$ indicates pixel data corresponding to the second dark-field image, and $I_d$ indicates pixel data corresponding to the first dark-field image.

* * * * *